United States Patent
Choi et al.

(10) Patent No.: US 11,216,999 B2
(45) Date of Patent: Jan. 4, 2022

(54) ELECTRONIC DEVICE AND METHOD FOR PROVIDING AVATAR BASED ON EMOTION STATE OF USER

(71) Applicant: SAMSUNG ELECTRONICS CO., LTD., Suwon-si (KR)

(72) Inventors: Inho Choi, Suwon-si (KR); Kwangchoon Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 92 days.

(21) Appl. No.: 16/556,379

(22) Filed: Aug. 30, 2019

(65) Prior Publication Data
US 2020/0202603 A1 Jun. 25, 2020

(30) Foreign Application Priority Data
Dec. 21, 2018 (KR) .................. 10-2018-0167106

(51) Int. Cl.
*G06T 11/80* (2006.01)
*G06F 3/01* (2006.01)
*G06T 11/40* (2006.01)

(52) U.S. Cl.
CPC .............. *G06T 11/80* (2013.01); *G06F 3/011* (2013.01); *G06F 3/017* (2013.01); *G06T 11/40* (2013.01)

(58) Field of Classification Search
CPC .......... G06T 11/80; G06T 11/40; G06F 3/011; G06F 3/017
See application file for complete search history.

(56) References Cited

U.S. PATENT DOCUMENTS 8,132,100 B2 * 3/2012 Seo ................... H04M 1/72427
715/706
8,694,899 B2 4/2014 Goossens et al.
(Continued)

FOREIGN PATENT DOCUMENTS

CN 104933113 9/2015
KR 10-2017-0002100 1/2017
(Continued)

OTHER PUBLICATIONS

International Search Report and Written Opinion dated Dec. 24, 2019 in counterpart International Patent Application No. PCT/KR2019/011066.
(Continued)

*Primary Examiner* — Yu Chen
(74) *Attorney, Agent, or Firm* — Nixon & Vanderhye P.C.

(57) ABSTRACT

An electronic device may include: a camera, a display, a processor operatively coupled to the camera and the display, and a memory operatively coupled to the processor. The memory may store a plurality of avatar templates containing a plurality of gestures and instructions. The instructions, when executed by the processor may control the electronic device to: obtain an image of an external object using the camera, obtain a value of at least one parameter corresponding to an emotion state based on the obtained image, select an avatar template including a first gesture from among the plurality of avatar templates based on the value of the at least one parameter, generate an avatar sticker including a second gesture different from the first gesture based on the selected avatar template and the value of the at least one parameter, and display the generated avatar sticker on at least a portion of the display.

19 Claims, 13 Drawing Sheets

(56) References Cited

U.S. PATENT DOCUMENTS

| | | | |
|---|---|---|---|
| 9,626,152 B2 | 4/2017 | Kim et al. | |
| 9,652,134 B2 | 5/2017 | Goossens et al. | |
| 9,792,279 B2 | 10/2017 | Kim et al. | |
| 9,819,716 B2 | 11/2017 | Kim | |
| 10,152,207 B2 | 12/2018 | Luo et al. | |
| 10,182,095 B2 | 1/2019 | Kim | |
| 10,386,996 B2 | 8/2019 | Santossio et al. | |
| 10,444,963 B2 | 10/2019 | Bereza et al. | |
| 2005/0280660 A1* | 12/2005 | Seo | H04M 1/72427 345/629 |
| 2008/0039124 A1* | 2/2008 | Linder | H04M 1/72436 455/466 |
| 2010/0302254 A1* | 12/2010 | Min | G06T 13/80 345/473 |
| 2013/0038601 A1* | 2/2013 | Han | G06F 3/011 345/419 |
| 2013/0198210 A1 | 8/2013 | Lee et al. | |
| 2016/0210116 A1* | 7/2016 | Kim | G06F 3/167 |
| 2016/0210279 A1* | 7/2016 | Kim | G06F 40/30 |
| 2016/0364895 A1 | 12/2016 | Santossio et al. | |
| 2017/0052946 A1 | 2/2017 | Gu et al. | |
| 2017/0098122 A1* | 4/2017 | el Kaliouby | G16H 50/30 |
| 2017/0171280 A1 | 6/2017 | Kim | |
| 2017/0357417 A1* | 12/2017 | Goossens | G06F 3/04845 |
| 2018/0027042 A1* | 1/2018 | Kim | H04L 65/4015 348/14.12 |
| 2018/0068020 A1 | 3/2018 | Lee et al. | |
| 2018/0088787 A1 | 3/2018 | Bereza et al. | |
| 2018/0091732 A1* | 3/2018 | Wilson | G06F 3/048 |
| 2018/0157901 A1* | 6/2018 | Arbatman | H04L 12/1827 |
| 2018/0189553 A1 | 7/2018 | Guo et al. | |
| 2019/0012599 A1* | 1/2019 | el Kaliouby | G06N 3/084 |
| 2019/0325633 A1* | 10/2019 | Miller, IV | G06F 3/04847 |
| 2020/0026347 A1* | 1/2020 | el Kaliouby | H04L 51/10 |

FOREIGN PATENT DOCUMENTS

| | | |
|---|---|---|
| KR | 10-2017-0035350 | 3/2017 |
| KR | 10-2017-0061647 | 6/2017 |

OTHER PUBLICATIONS

Extended European Search Report dated Nov. 18, 2021 for EP Application No. 19900991.1.

* cited by examiner

CURRENT EMOTION STATE (1201)

| Feature | Value |
|---|---|
| Neutral | 0.1 |
| Happy | 0.8 |
| Surprise | 0.1 |
| Angry | 0 |
| Fear | 0 |
| Sadness | 0 |
| Contempt | 0 |
| Disgust | 0 |

+

HISTORY INFORMATION (1202)

| Feature | Value | | Feature | Value |
|---|---|---|---|---|
| Neutral | 0 | | Neutral | 0.2 |
| Happy | 0 | | Happy | 0.2 |
| Surprise | 0.6 | ... | Surprise | 0.6 |
| Angry | 0.4 | | Angry | 0 |
| Fear | 0 | | Fear | 0 |
| Sadness | 0 | | Sadness | 0 |
| Contempt | 0 | | Contempt | 0 |
| Disgust | 0 | | Disgust | 0 |
| Sticker ID | 0x0357 | | Sticker ID | 0x0368 |

RECOMMENDED AVATAR STICKER INFORMATION (1203)

| Score | Sticker ID |
|---|---|
| 0.9 | 0x1223 |
| 0.8 | 0x1254 |
| 0.7 | 0x1245 |
| ... | ... |
| 0.1 | 0x1274 |

FIG.12

ELECTRONIC DEVICE AND METHOD FOR PROVIDING AVATAR BASED ON EMOTION STATE OF USER

CROSS-REFERENCE TO RELATED APPLICATION

This application is based on and claims priority under 35 U.S.C. § 119 to Korean Patent Application No. 10-2018-0167106, filed on Dec. 21, 2018, in the Korean Intellectual Property Office, the disclosure of which is incorporated by reference herein in its entirety.

BACKGROUND

1. Field

The disclosure relates to an electronic device and a method for providing an avatar based on an emotion state of a user.

2. Description of Related Art

An electronic device may use a camera to recognize an appearance of a user (e.g., at least one of a user's face, a user's body, or an accessory worn by the user) and generate a three-dimensional avatar based on the recognized user's appearance. The avatar may be referred to as an augmented reality (AR) emoji. The electronic device may provide a visual effect that represents a user's emotion state via an avatar that resembles the user's appearance.

An electronic device may generate an avatar prototype that does not contain a gesture based on an appearance of a user recognized by a camera and combine the avatar prototype with an avatar template containing a specific gesture to generate an avatar sticker containing a gesture. The avatar sticker may be a dynamic image or a video.

In order for the user to transmit an avatar sticker representing a specific gesture to another user's electronic device, the electronic device may display, on a display, a list of avatar stickers generated based on the avatar template and receive user input of selecting one avatar sticker from the displayed list.

The more emotion states the user wants to deliver, the more avatar stickers should be generated and stored by the electronic device. As the number of the avatar stickers increases, a volume of a memory space occupied by the avatar stickers of the electronic device may increase. As the number of the avatar stickers displayed on the display increases, the time required for the user to identify the list to select a desired avatar sticker increases. Therefore, the user may experience inconvenience.

Further, even though emotion states of a plurality of users are the same, a facial expression and a gesture may be different for each user. However, the electronic device may not be able to deliver the emotion state of the user accurately when an avatar template is based on a standardized gesture.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and to provide at least the advantages described below. Accordingly, an example aspect of the disclosure provides an electronic device including: a camera, a display, a processor operatively coupled to the camera and the display, and a memory operatively coupled to the processor. The memory stores a plurality of avatar templates containing a plurality of gestures and instructions. When the instructions are executed, the processor may be configured to control the electronic device to: obtain an image of an external object using the camera, obtain a value of at least one parameter corresponding to an emotion state based on the obtained image, select an avatar template including a first gesture from among the plurality of avatar templates based on the value of the at least one parameter, generate an avatar sticker including a second gesture different from the first gesture based on the selected avatar template and the value of the at least one parameter, and display the generated avatar sticker on at least a portion of the display.

Another example aspect of the disclosure provides a method of operating an electronic device including: obtaining an image of an external object, obtaining a value of at least one parameter corresponding to an emotion state based on the obtained image, selecting an avatar template including a first gesture from among the plurality of avatar templates based on the value of the at least one parameter, generating an avatar sticker including a second gesture different from the first gesture based on the selected avatar template and the value of the at least one parameter, and displaying the generated avatar sticker.

Still another example aspect of the disclosure provides an electronic device including: a camera, a display, a processor operatively coupled to the camera and the display, and a memory operatively coupled to the processor. The memory stores a plurality of avatar templates including an avatar template containing a first gesture and instructions. When the instructions are executed, the processor is configured to control the electronic device to: execute a message application, display an icon for calling the plurality of avatar templates on at least a portion of the display, execute the camera in response to an input received on the icon, obtain an image of an external object using the camera, obtain a value of at least one parameter corresponding to an emotion state based on the obtained image, generate an avatar sticker including a second gesture different from the first gesture based on the value of the at least one parameter, and display the generated avatar sticker on at least a portion of the display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 12 is a diagram illustrating an example operation of an electronic device that generates an avatar sticker based on history information according to various embodiments.

In the description of the drawings, the same or similar reference numerals may be used for the same or similar components.

DETAILED DESCRIPTION

Hereinafter, various embodiments of the disclosure will be described with reference to accompanying drawings. Various embodiments of the disclosure used herein are not intended to limit the disclosure to specific embodiments, and it should be understood that the embodiments may include modifications, equivalents, and/or alternatives on the corresponding embodiments described herein.

Figure 1:
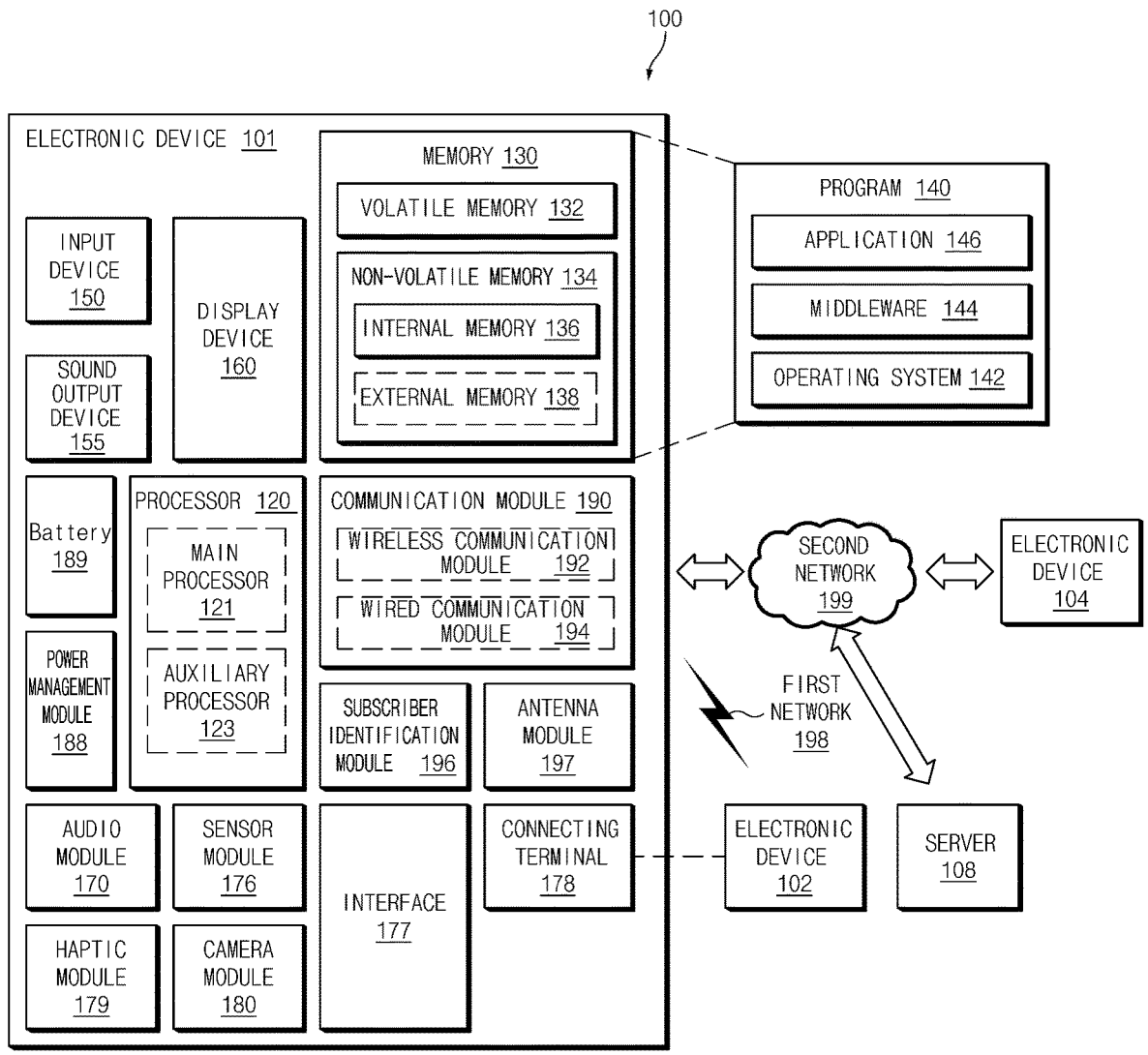
FIG. 1 is a block diagram illustrating an example electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

According to an embodiment, the memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

According to an embodiment, the program 140 may be stored in the memory 130 as software, and may include, for example, an operating system (OS) 142, middleware 144, or an application 146.

According to an embodiment, the input device 150 may receive a command or data to be used by other component (e.g., the processor 120) of the electronic device 101, from the outside (e.g., a user) of the electronic device 101. The input device 150 may include, for example, a microphone, a mouse, or a keyboard.

According to an embodiment, the sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

According to an embodiment, the display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

According to an embodiment, the audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

According to an embodiment, the sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

According to an embodiment, the interface 177 may support one or more specified protocols to be used for the electronic device 101 to be coupled with the external electronic device (e.g., the electronic device 102) wiredly or wirelessly. The interface 177 may include, for example, a high definition multimedia interface (HDMI), a universal serial bus (USB) interface, a secure digital (SD) card interface, or an audio interface.

According to an embodiment, a connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

According to an embodiment, the haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

According to an embodiment, the camera module 180 may capture a still image or moving images. According to an embodiment, the camera module 180 may include one or more lenses, image sensors, image signal processors, or flashes.

According to an embodiment, the power management module 188 may manage power supplied to the electronic device 101. The power management module 188 may be implemented as at least part of, for example, a power management integrated circuit (PMIC).

According to an embodiment the battery 189 may supply power to at least one component of the electronic device 101. The battery 189 may include, for example, a primary cell which is not rechargeable, a secondary cell which is rechargeable, or a fuel cell.

According to an embodiment, the communication module (or communication circuitry) 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. According to an embodiment, the wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may be formed of a conductor or a conductive pattern. In another embodiment, the antenna module 197 may further include another component (e.g., RFIC) in addition to the conductor or the conductive pattern. According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
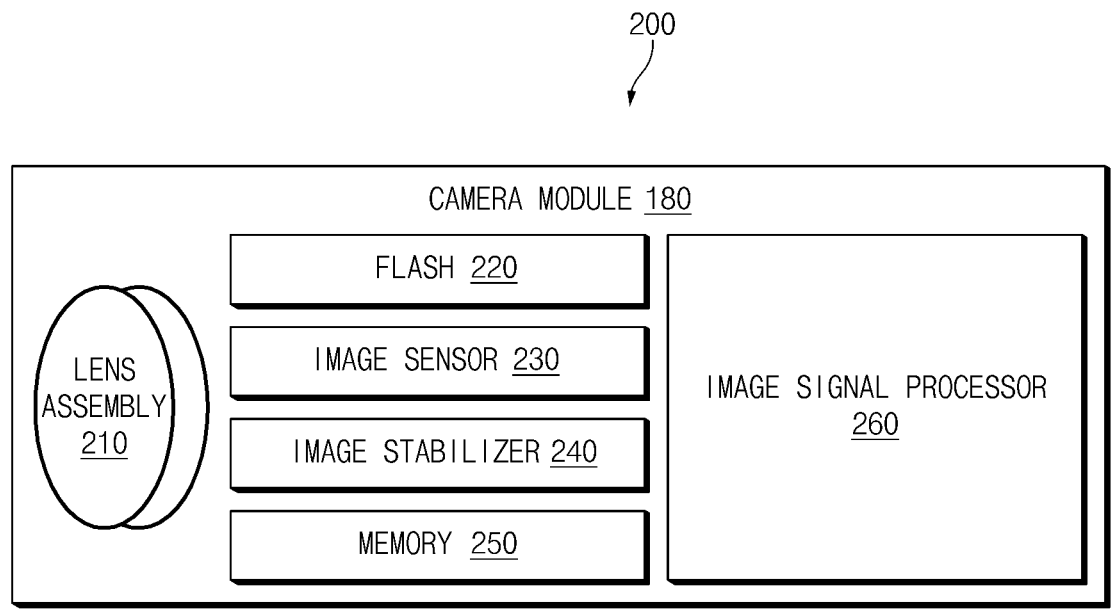
FIG. 2 is a block diagram illustrating an example camera module according to various embodiments.

FIG. 2 is a block diagram 200 illustrating an example configuration of the camera module 180 according to various embodiments.

Referring to FIG. 2, the camera module 180 may include a lens assembly 210, a flash 220, an image sensor 230, an image stabilizer (e.g., including image stabilizing circuitry) 240, memory 250 (e.g., buffer memory), and/or an image signal processor (e.g., including image signal processing circuitry) 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens. The flash 220 may emit light that is used to reinforce light reflected from an object. The flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may be implemented, for example, as an optical image stabilizer. The image stabilizer 240 may sense such a movement by the camera module 180 or the electronic device 101 using a gyro sensor (not shown) or an acceleration sensor (not shown) disposed inside or outside the camera module 180.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera or a front camera and at least another of the plurality of camera modules 180 may form a telephoto camera or a rear camera.

In the various example embodiments described below, the electronic device 101 may generate an avatar sticker based on an emotion state of the user. In this disclosure, the avatar sticker may refer, for example, to a dynamic image or video of an avatar with a gesture. The gesture may include, for example, and without limitation, at least one of a facial expression, a hand gesture, a body gesture, or the like. In order to avoid confusion of terms, in this disclosure, an avatar sticker, which includes a specified gesture and is pre-stored in the memory of the electronic device 101 before analyzing the emotion state of the user, among the avatar stickers may be referred to, for example, as an "avatar template".

Figure 3:
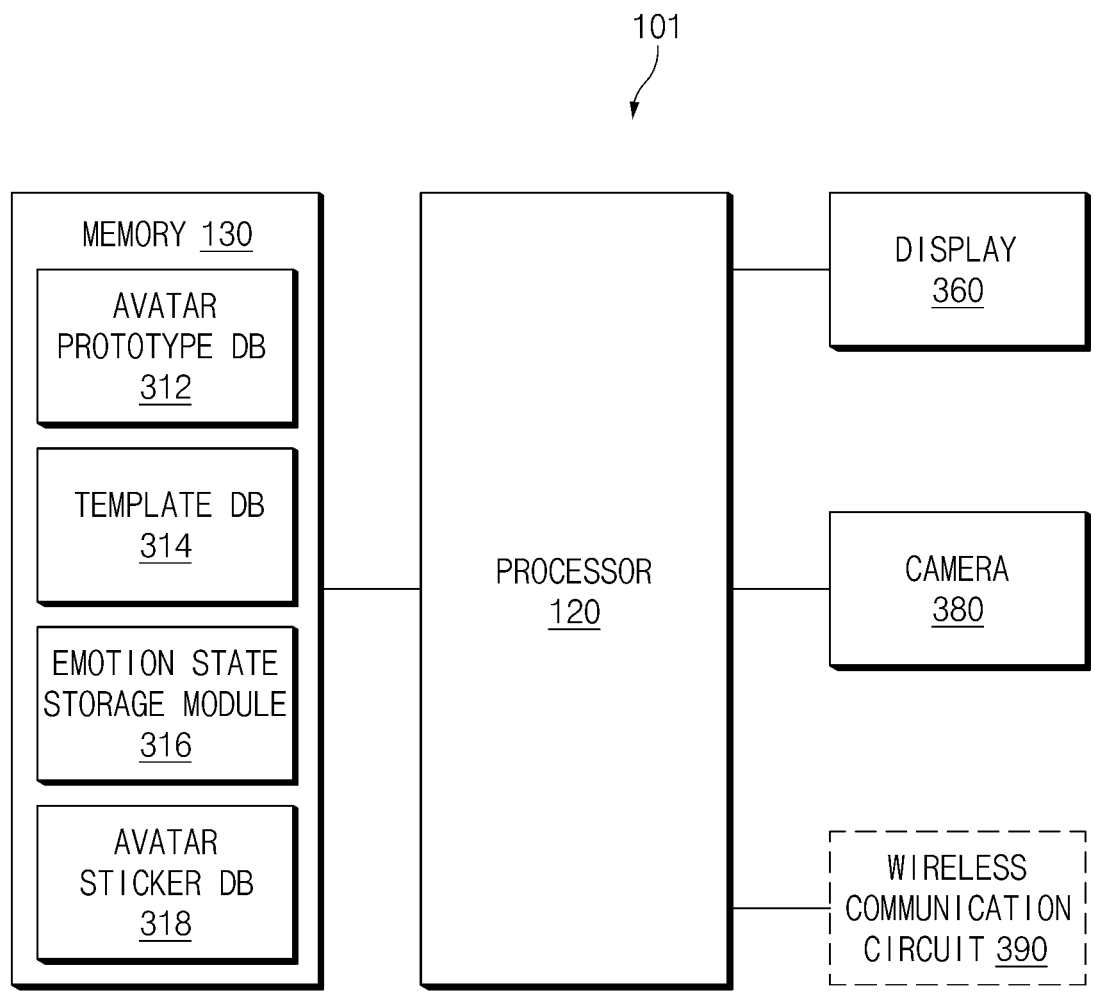
FIG. 3 is a block diagram illustrating an example electronic device according to various embodiments.

FIG. 3 is a block diagram illustrating an example configuration of the electronic device 101 according to various embodiments. Components illustrated in FIG. 3 that respectively have reference numerals the same as those of the components illustrated in FIG. 1 may respectively perform the functions or operations described in FIG. 1.

Referring to FIG. 3, the electronic device 101 may include the processor (e.g., including processing circuitry) 120, the memory 130, a display 360 (e.g., at least a portion of the display device 160 in FIG. 1), and a camera 380 (e.g., at least a portion of the camera module 180 in FIG. 1).

According to an example embodiment, the camera 380 may obtain an image of an external object (e.g., an appearance of the user). The camera 380 may include, for example, at least one of the components of the camera module 180 in FIG. 2. According to an example embodiment, the camera 380 may be disposed on a side (e.g., a front surface of the electronic device 101) the same as a side on which the display 360 is disposed. The processor 120 may guide the user via the display 360 to capture an image of the user (e.g., a face of the user) using the camera 380.

According to an example embodiment, the memory 130 may store a data base (DB). For example, the memory 130 may include an avatar prototype DB 312, a template DB 314, an emotion state storage module 316, and an avatar sticker DB 318.

According to an example embodiment, the avatar prototype DB 312 may include an avatar prototype of the user. The avatar prototype may refer, for example, to an avatar image that represents the user's appearance (e.g., face, body, costume, or accessory) in three dimensions but does not contain a gesture, a background object, and an effect object. The processor 120 may generate the avatar prototype for the user by obtaining the image of the user's appearance via the camera 380.

According to an example embodiment, the template DB 314 may include a plurality of avatar templates. According to another embodiment, the template DB 314 may, for example, and without limitation, include at least one of a predefined background object, effect object, or the like. The processor 120 may display a variety of emotion states of the user using the background object or the effect object. For example, the processor 120 may display an effect object or a background object of popping firecrackers on the display 360 together with the avatar sticker to represent a "surprise" of the emotion states of the user.

According to an example embodiment, the emotion state storage module 316 may refer, for example, to a portion of the memory that stores values of a plurality of parameters respectively indicating the emotion states of the user. The emotion state may include, for example, and without limitation, at least one of neutral, happy, surprise, angry, fear, sadness, contempt, disgust, or the like and may further include other emotion states in addition to the presented examples. Each of the parameters stored in the emotion state storage module 316 may refer, for example, to each category of the emotion states, and a value of each parameter may refer, for example, to a score of a corresponding emotion state. The electronic device 101 may analyze the image of the user to obtain a score (or a parameter value) representing the user's emotion state and may determine the user's emotion state based on the obtained score. The electronic device 101 may store the obtained score in the emotion state storage module 316.

According to an example embodiment, the avatar sticker DB 318 may store the avatar sticker generated based on the emotion state of the user. The avatar sticker based on the emotion state of the user may contain a gesture different from that of the avatar template. The gesture contained in the avatar sticker may differ from the gesture contained in the avatar template in, for example, and without limitation, at least one of a speed of movement, a range of change, a type of the gesture, or the like. For example, when the avatar template contains a smiling gesture, the avatar sticker generated based on the emotion state of the user may contain a gesture with a mouth whose corners are more lifted than that of the avatar template, a gesture with a mouth whose corners are lifted more faster than that of the avatar template, or a gesture further containing a hand gesture of raising a thumb. According to another embodiment, the avatar sticker may contain a background object (or an effect object) different from the background object (or effect object) stored in the template DB 314 in, for example, and without limitation, at least one of a speed of movement, a range of change, the number, a size, a color, a type, or the like. For example, when the effect object stored in the template DB contains a popping firecracker image, an effect object generated based on the emotion state of the user may contain an image with the increased number of firecrackers, with firecrackers popping bigger, or with firecrackers with increased popping speed.

According to an example embodiment, the avatar sticker DB 318 may include history information indicating usage history for avatar stickers selected from the user. The processor 120 may recommend a previously generated avatar sticker based on the history information.

According to an example embodiment, the processor 120 may be operatively coupled to the display 360, the camera 380, and the memory 130. The processor 120 may include various processing circuitry and execute instructions stored in the memory 130 to perform, and/or control the electronic device to perform, overall functions of the electronic device 101 to generate the avatar sticker.

For example, the processor 120 may obtain the image of the user (or the face of the user) via the camera 380 and analyze the emotion state of the user through the obtained image. The processor 120 may apply parameter values corresponding to the analyzed emotion state to the avatar templates stored in the template DB 314 to generate the avatar sticker. The processor 120 may generate the avatar sticker based on the emotion state of the user, so that the processor 120 may generate the avatar sticker that represents the emotion state of the user more precisely than the avatar templates.

According to an example embodiment, the display 360 may display a screen of an application that is executed on the electronic device 101. The display 360 may display the avatar sticker or the avatar template on the screen under control of the processor 120.

According to an example embodiment, the electronic device 101 may further include a wireless communication circuit 390 (e.g., at least a portion of the wireless communication module 192 in FIG. 1) configured to perform wireless communication with the external electronic device (e.g., a wearable device). The processor 120 may receive biometric information (e.g., heartbeat information) of the user from the external electronic device via the wireless communication circuit 390. The processor 120 may more accurately determine the emotion state of the user using the biometric information together with the image obtained via the camera 380.

Figure 4:
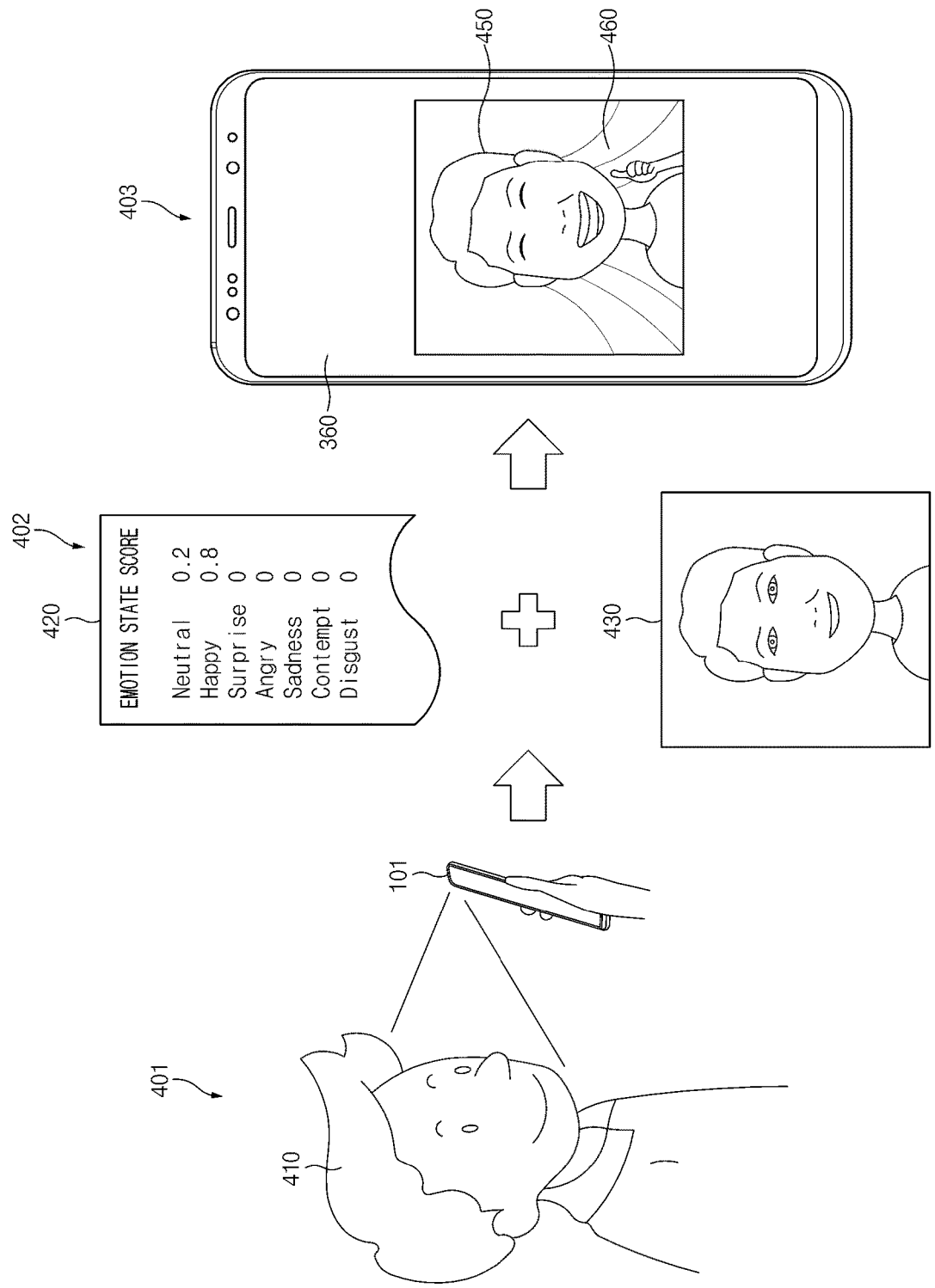
FIG. 4 is a diagram illustrating an example operation of an electronic device that generates an avatar sticker based on an emotion state of a user according to various embodiments.

FIG. 4 is a diagram illustrating an example operation of the electronic device 101 that generates an avatar sticker 450 based on an emotion state of a user according to various embodiments.

Referring to FIG. 4, in operation 401, the electronic device 101 may obtain an image (e.g., a facial image) of a user 410 via the camera 380. The electronic device 101 may analyze the obtained image. FIG. 4 illustrates an operation, by the electronic device 101, of analyzing the image. However, according to another embodiment, the electronic device 101 may determine the emotion state of the user based, for example, and without limitation, on at least one of biometric information, text input received by user input, or the like. According to an example embodiment, the electronic device 101 may, for example, and without limitation, analyze at least one of a user's facial expression, biometric information, text input represented by the image, or the like, based on machine learning to determine the user's emotion state.

In operation 402, the electronic device 101 may generate an avatar sticker (e.g., 450) from an avatar template (e.g., 430) based on the emotion state of the user determined as a result of the analysis. According to an example embodiment, the electronic device 101 may generate the avatar sticker using an avatar template whose parameter value corresponds to the highest value, using an avatar template whose parameter value is equal to or greater than a specified threshold (e.g., 0.5), or using all avatar templates whose parameter values are greater than 0, respectively.

For example, in information 420 indicating a current emotion state of the user, a value of a parameter indicating "happy" may be 0.8 and a value of a parameter indicating "neutral" may be 0.2. Because the value of the parameter indicating the "happy" is the highest, the electronic device 101 may select the avatar template 430 indicating the "happy" stored in the template DB 314. The electronic device 101 may apply a weight based on the value of the parameter to the selected avatar template 430 to generate the avatar sticker 450. A speed of movement, a range of change, or a type of the gesture contained in the avatar sticker 450 may be differ from a speed of movement, a range of change, or a type of a gesture contained in the avatar template 430 because the speed of movement, the range of change, or the type of the gesture in the avatar sticker 450 is determined based on the value of the parameter. In another example, the electronic device 101 may select the avatar template 430 indicating the "happy" and an avatar template (not shown) indicating "neutral". The electronic device 101 may apply weights respectively based on parameter values to the respective avatar templates and combine the avatar templates to which the weights are applied respectively with each other to generate the avatar sticker 450.

FIG. 4 illustrates an embodiment with the plurality of parameter values indicating the emotion state of the user. However, according to other embodiments, a single value of the parameter may indicate the emotion state of the user. According to another embodiment, a value indicating the user's emotion state may be represented as a value (e.g., integer or percentage) other than a decimal point value.

According to an embodiment, the electronic device 101 may combine an effect object or a background object into the avatar sticker 450 based on a value of a parameter. For example, when the value of the parameter (e.g., 0.8) corresponding to "happy" is greater than or equal to a specified threshold value (e.g., 0.7), the electronic device 101 may combine a background object (e.g., 460) representing "happy" to the avatar sticker 450. According to an example embodiment, the electronic device 101 may change at least one of a speed of movement, a range of change, a size, a color, or a type of the effect object or the background object based on the parameter value.

In operation 403, the electronic device 101 may display the avatar sticker 450 on at least a portion of the display 360. When the value of the parameter corresponding to the "happy" is greater than or equal to the specified threshold value, the avatar sticker 450 may further contain the background object 460.

Figure 5A:
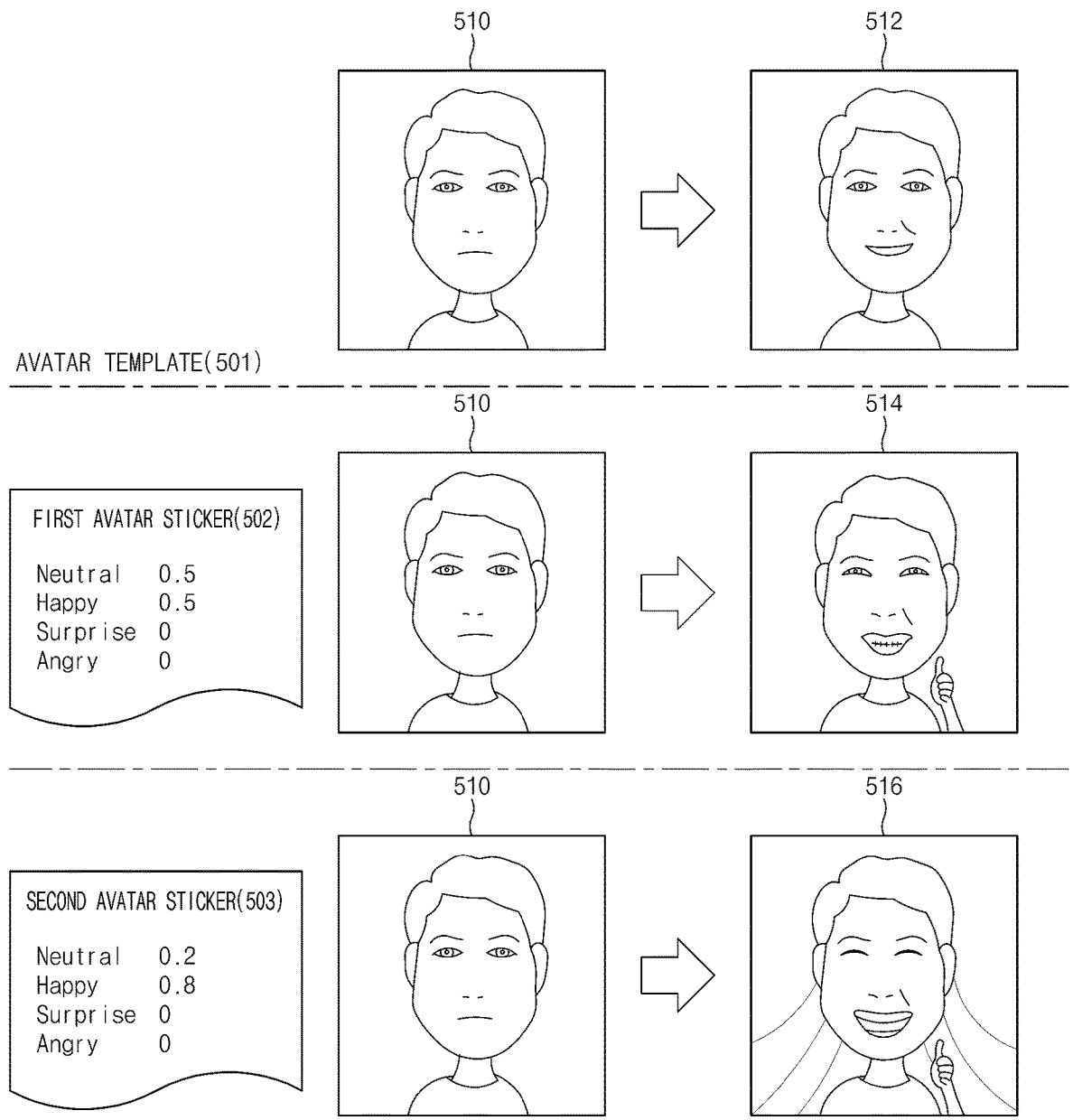
FIG. 5A is a diagram illustrating an example of an avatar sticker based on an emotion state of a user.
Figure 5B:
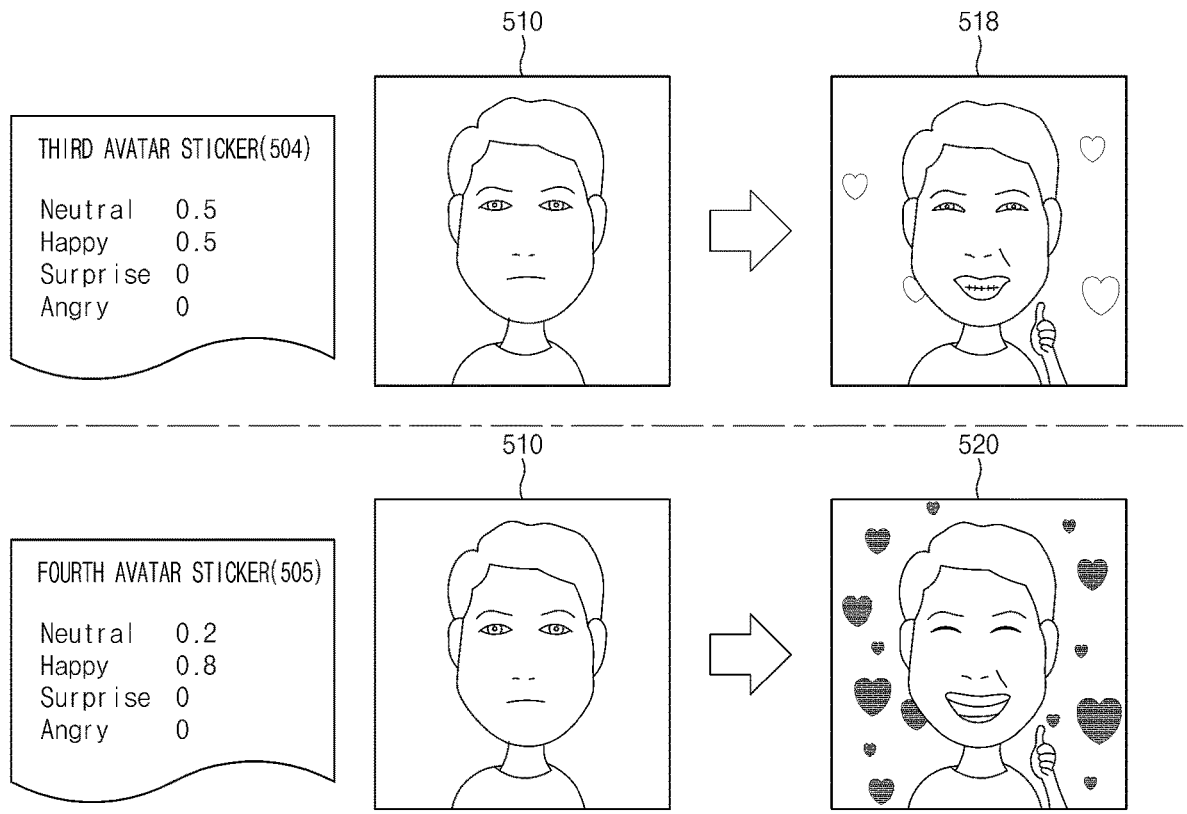
FIG. 5B is a diagram illustrating another example of an avatar sticker based on an emotion state of a user.

FIGS. 5A and 5B are diagrams illustrating examples of an avatar sticker based on an emotion state of a user. FIGS. 5A and 5B illustrate embodiments of generating an avatar sticker using a single avatar template 501. However, the disclosure is not limited thereto, and the electronic device 101 may generate the avatar sticker using a plurality of avatar templates.

Referring to FIGS. 5A and 5B, the avatar template (e.g., 501) and an avatar sticker (e.g., 502, 503, 504, and 505) may be a dynamic image or a video including a plurality of image frames. A file format of the avatar template or the avatar sticker may be at least one of gif, jpg, png, avi, or gif.

According to an example embodiment, the avatar template 501 may include a first image frame 510, a second image frame 512 and at least one image frame between the first image frame 510 and the second image frame 512. In this example, the electronic device 101 may provide a visual effect in which an avatar moves from the first image frame 510 to the second image frame 512 via the avatar template 501. With the same principle, the electronic device 101 may provide a visual effect in which the avatar moves from the first image frame 510 to a third image frame 514 via a first avatar sticker 502, a visual effect in which the avatar moves from the first image frame 510 to a fourth image frame 516 via a second avatar sticker 503, a visual effect in which the avatar and an object (e.g., a background object or effect object) move from the first image frame 510 to a fifth image frame 518 via a third avatar sticker 504, and a visual effect in which the avatar and the object move from the first image frame 510 to a sixth image frame 520 via a fourth avatar sticker 505.

For example, referring to FIG. 5A, when a value of a parameter indicating "happy" in the emotion state of the user is 0.5, a weight is applied to a motion vector for a facial expression in the smiling avatar template 501. Therefore, the first avatar sticker 502 may display a face with a bigger smile than the avatar template 501. Further, when the value of the parameter indicating the "happy" is 0.8, the weight applied to the motion vector increases. Therefore, the second avatar sticker 503 may display a face with a smile bigger than that of the face in the first avatar sticker 502. Further, when the value of the parameter is equal to or greater than a first threshold value (e.g., 0.5), the first avatar sticker 502 and the second avatar sticker 503 may further contain a gesture representing a hand gesture. When the value of the parameter is equal to or above a specified second threshold value (e.g., 0.7), the second avatar sticker 503 may further contain a background object (e.g., 460 in FIG. 4).

In another example, referring to FIG. 5B, when the value of the parameter indicating the "happy" is greater than or equal to the specified first threshold value (e.g., 0.5), a background object including hearts may be inserted into the fifth image frame 518. When the value of the parameter indicating the "happy" is equal to or greater than the second threshold value (e.g., 0.7), at least one of a speed of movement, a range of change, the number, a size, a color, or a type of the background object may be changed. For example, a background object contained in the sixth image frame 520 may have hearts whose number and size are increased and color is changed compared to the hearts of the background object contained in the fifth image frame 518.

Figure 6:
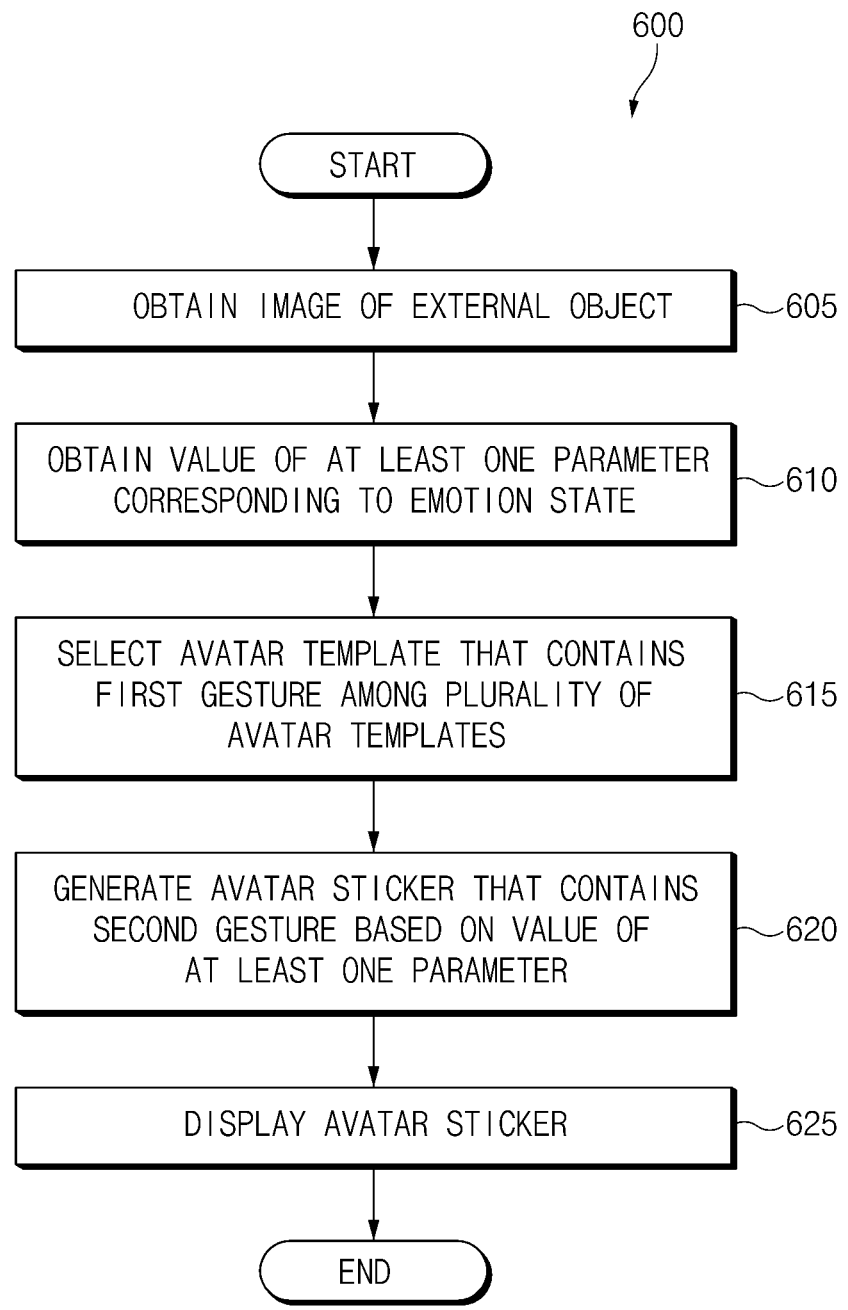
FIG. 6 is a flowchart illustrating an example operation of an electronic device that generates an avatar sticker based on an emotion state of a user according to various embodiments.

FIG. 6 is a flowchart 600 illustrating an example operation of the electronic device 101 that generates an avatar sticker based on an emotion state of a user according to various embodiments. Operations included in the operational flowchart 600 and other operational flowcharts below may be performed by the electronic device 101 and may be performed by the component (e.g., the processor 120) of the electronic device 101.

Referring to FIG. 6, in operation 605, the electronic device 101 may obtain the image of the external object (e.g., the face of the user). According to another embodiment, the electronic device 101 may obtain the biometric information or the textual input of the user.

In operation 610, the electronic device 101 may obtain a value of at least one parameter corresponding to the emotion state of the user based, for example, and without limitation, on at least one of the obtained image, the biometric information, or the text input. According to an example embodiment, the electronic device 101 may obtain the value of the at least one parameter based on the machine learning.

In operation 615, the electronic device 101 may select an avatar template (e.g., 430 in FIG. 4) that contains a first gesture (e.g., a smiling gesture) among the plurality of avatar templates stored in the template DB 314 based on the value of the at least one parameter.

In operation 620, the electronic device 101 may generate an avatar sticker (e.g., 450 in FIG. 4) that contains a second gesture (e.g., a gesture of laughing bigger and lifting a thumb) based on the value of the at least one parameter. For example, the electronic device 101 may apply the weight based on the value of the at least one parameter to the avatar template to generate the avatar sticker. Because the weight is applied to the avatar sticker, a speed of movement, a range of change, or a type of the gesture of the second gesture may be different from a speed of movement, a range of change, or a type of the gesture of the first gesture.

In operation 625, the electronic device 101 may display the avatar sticker on at least a portion of the display (e.g., 360 in FIG. 3).

Figure 7:
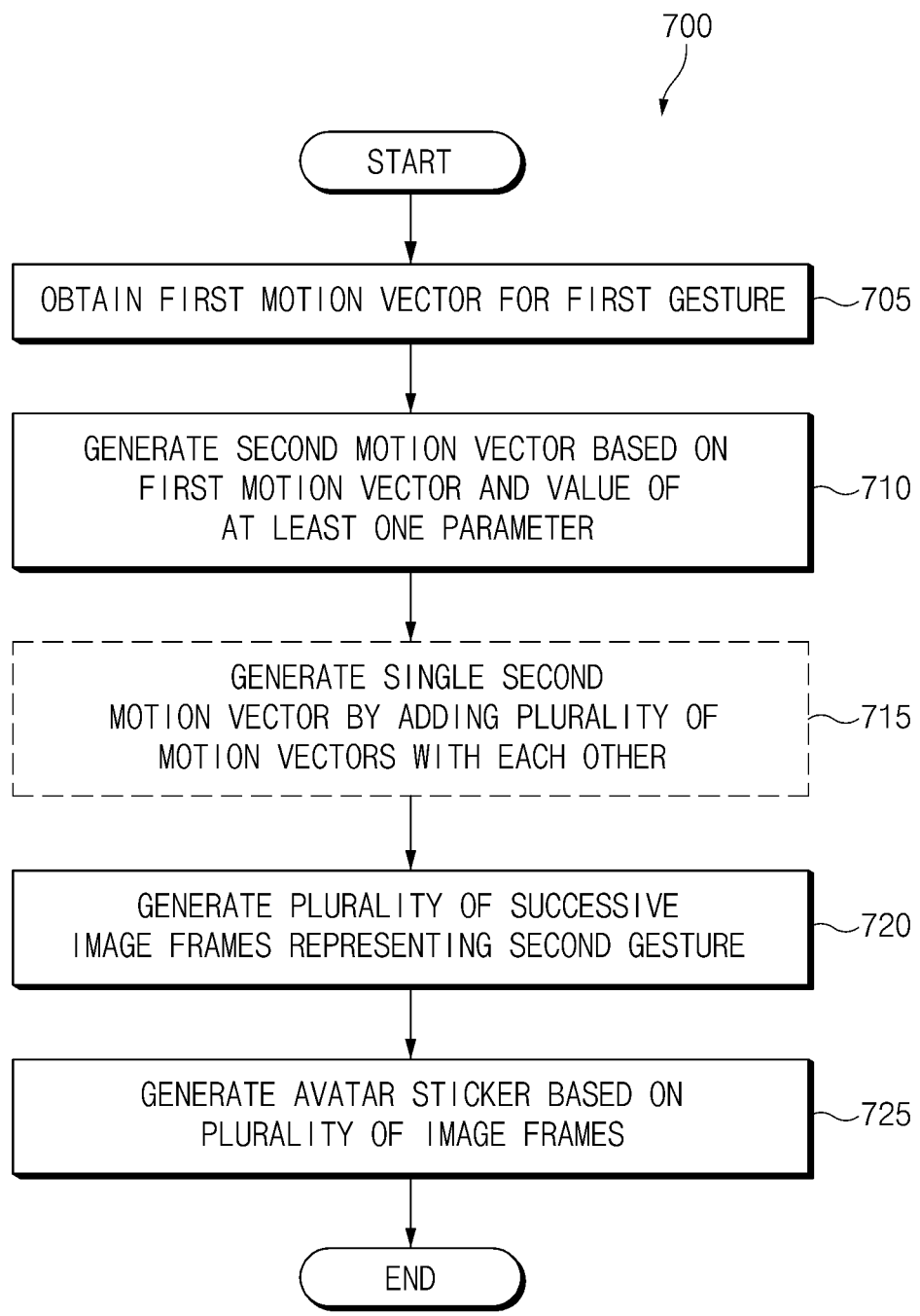
FIG. 7 is a flowchart illustrating an example operation of an electronic device that generates a plurality of image frames generating an avatar sticker according to various embodiments.

FIG. 7 is a flowchart 700 illustrating an example operation of the electronic device 101 that generates a plurality of image frames generating an avatar sticker according to various embodiments. Operations illustrated in FIG. 7 may be an example embodiment of the operation 620 in FIG. 6.

Referring to FIG. 7, in operation 705, the electronic device 101 may use a previously defined motion vector in the avatar template to obtain a first motion vector for the first gesture.

In operation 710, the electronic device 101 may generate a second motion vector based on the first motion vector and the value of the at least one parameter. For example, the electronic device 101 may generate the second motion vector by multiplying the first motion vector by the weight based on the value of the at least one parameter.

When there are the plurality of values of the parameters, in operation 715, the electronic device 101 may generate a single second motion vector by adding a plurality of motion vectors with each other. For example, when the value of the parameter indicating the "neutral" is 0.2, and the value of the parameter indicating the "happy" is 0.5, and the value of the parameter indicating "surprise" is 0.3, the electronic device 101 may generate a second motion vector FN using a linear combination as shown in Equation 1 below.

$$F_N = a_1 \times T_1 + a_2 \times T_2 + a_3 \times T_3$$ (Equation 1)

In Equation 1, $a_1$ may represent a weight based on the value of the parameter indicating the "neutral" and $T_1$ may represent a motion vector of the avatar template indicating the "neutral". Further, $a_2$ may represent a weight based on the value of the parameter indicating the "happy" and $T_2$ may represent a motion vector of the avatar template indicating the "happy". Further, $a_3$ may represent a weight based on the value of the parameter indicating the "surprise" and $T_3$ may represent a motion vector of the avatar template indicating the "surprise".

When the number of the parameter value is one according to an example embodiment, the electronic device 101 may skip the operation 715.

In operation 720, the electronic device 101 may generate a plurality of image frames (e.g., 510 to 514 or 510 to 516 in FIG. 5), which are successive, representing the second gesture using the second motion vector. In the following, a plurality of image frames containing only a gesture other than a background object or an effect object may be referred to as a plurality of first image frames. Further, as described in greater detail below with reference to FIG. 8, a plurality of image frames, containing at least one of a background object or an effect object, may be referred to as second image frames.

In operation 725, the electronic device 101 may generate an avatar sticker (e.g., 450 in FIG. 4) based on the plurality of image frames. For example, the electronic device 101 may generate the avatar sticker by combining the plurality of first image frames together. In another example, the electronic device 101 may combine the plurality of first image frames with the plurality of second image frames frame by frame and add the plurality of combined image frames together to generate an avatar sticker containing at least one of the background object or the effect object.

Figure 8:
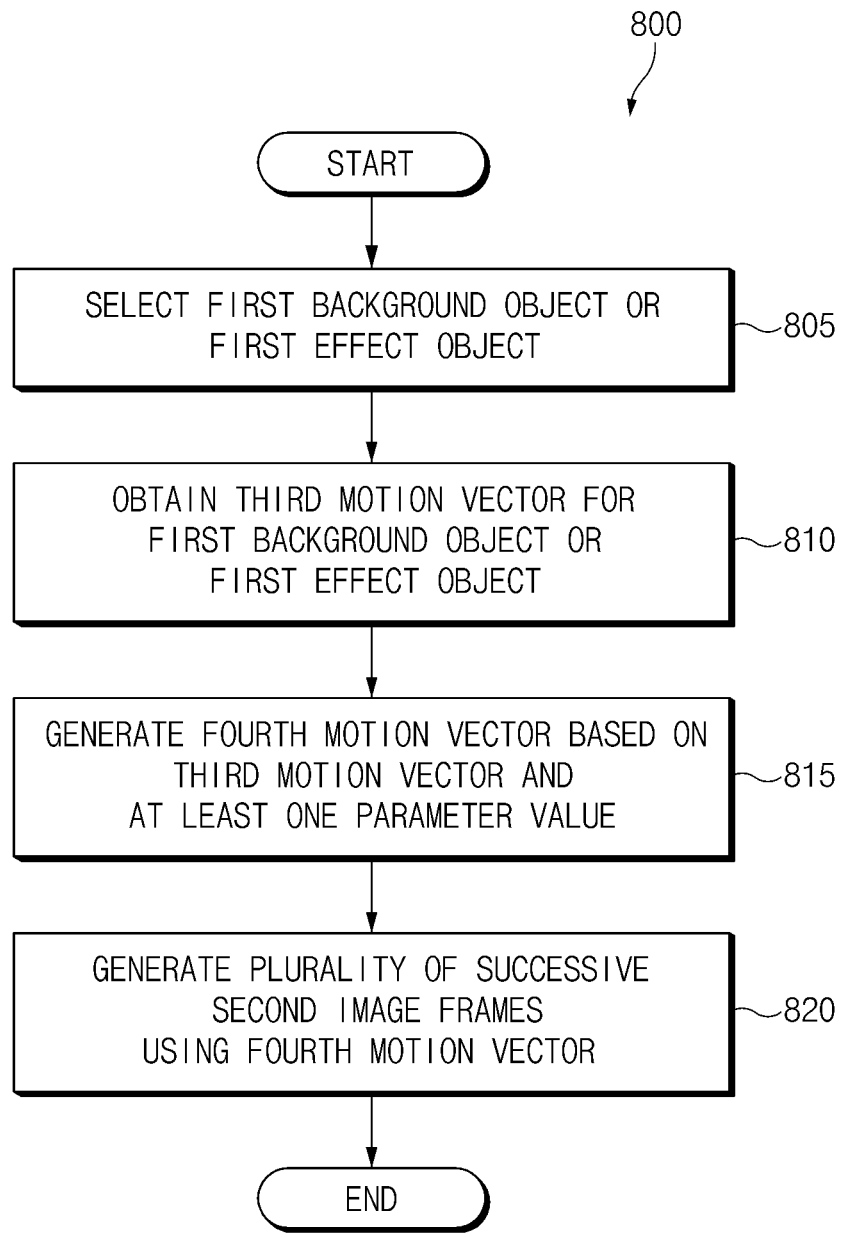
FIG. 8 is a flowchart illustrating an example operation of an electronic device that generates a plurality of image frames representing a background object or an effect object according to various embodiments.

FIG. 8 is a flowchart 800 illustrating an example operation of the electronic device 101 that generates a plurality of image frames representing a background object or an effect object according to various embodiments. Operations illustrated in FIG. 8 may be an example embodiment of the operation 720 in FIG. 7.

Referring to FIG. 8, in operation 805, the electronic device 101 may select at least one of a first background object or a first effect object among a plurality of background objects and effect objects stored in the template DB 314 based on the value of the at least one parameter. For example, when there are the plurality of parameter values, the electronic device 101 may select at least one of the first background object or the first effect object corresponding to a parameter having the highest value.

In operation 810, the electronic device 101 may obtain a third motion vector for the at least one of the first background object or the first effect object selected by analyzing feature points.

In operation 815, the electronic device 101 may generate a fourth motion vector based on the third motion vector and the at least one parameter value. For example, the electronic device 101 may generate the fourth motion vector by multiplying the third motion vector by a weight based on the at least one parameter value.

In operation 820, the electronic device 101 may generate the plurality of second image frames, which are successive, using the fourth motion vector. The plurality of second image frames may exhibit an effect in which at least one of the background object or the effect object is moving.

According to an example embodiment, the electronic device 101 may perform the operations in FIG. 8 after the operation 720 in FIG. 7 is performed. In another example, the electronic device 101 may generate the fourth motion vector before generating the plurality of first image frames. The electronic device 101 may generate the plurality of first image frames and the plurality of second image frames after the fourth motion vector is generated.

Figure 9:
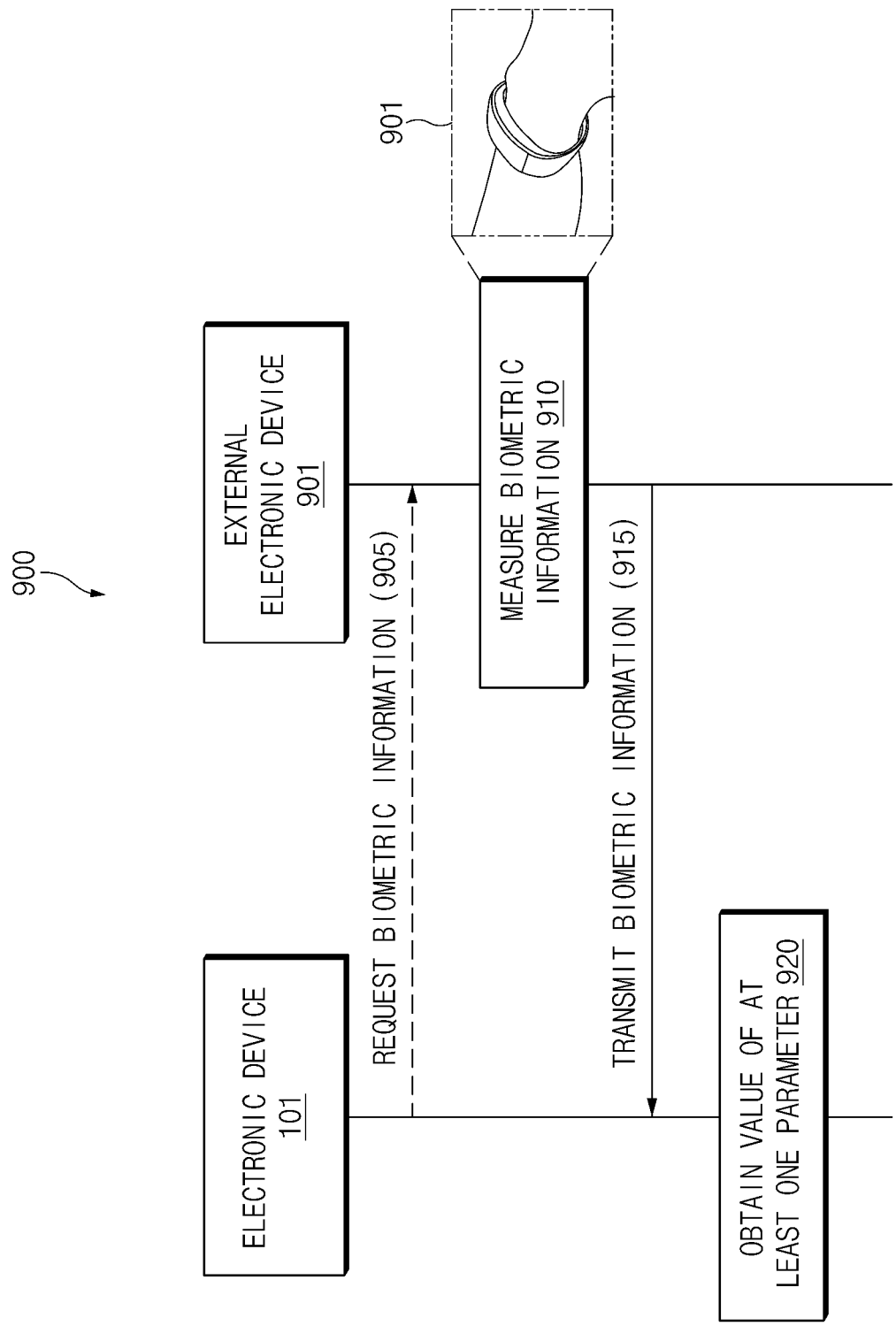
FIG. 9 is a signal flow diagram illustrating an example of obtaining a value of a parameter using biometric information received from an external electronic device according to various embodiments.

FIG. 9 is a signal flow diagram 900 illustrating an example operation of obtaining a value of a parameter using biometric information received from an external electronic device 901 according to various embodiments.

Referring to FIG. 9, the external electronic device 901 may, for example, be a wearable device that is worn on a part of the user's body (e.g., a wrist). In order to receive the biometric information from the external electronic device 901, the electronic device 101 may include a wireless communication circuit (e.g., 390 in FIG. 3).

In operation 905, the electronic device 101 may request the external electronic device 901 for the biometric information. For example, the electronic device 101 may request the biometric information when the camera is executed to acquire the image of the user or when the user input is received.

According to another embodiment, the electronic device 101 may skip the operation 905. In this example, the electronic device 101 may receive the biometric information from the external electronic device 901 in a periodic manner.

In operation 910, the external electronic device 901 may use a sensor to measure the biometric information (e.g., heartbeat information) from the part of the user's body.

In operation 915, the external electronic device 901 may transmit the measured biometric information to the electronic device 101.

In operation 920, the electronic device 101 may use the received biometric information and the analysis result of the image to obtain the value of the at least one parameter corresponding to the emotion state of the user. According to an example embodiment, the electronic device 101 may obtain the value of the at least one parameter based, for example, and without limitation, on machine learning.

Figure 10:
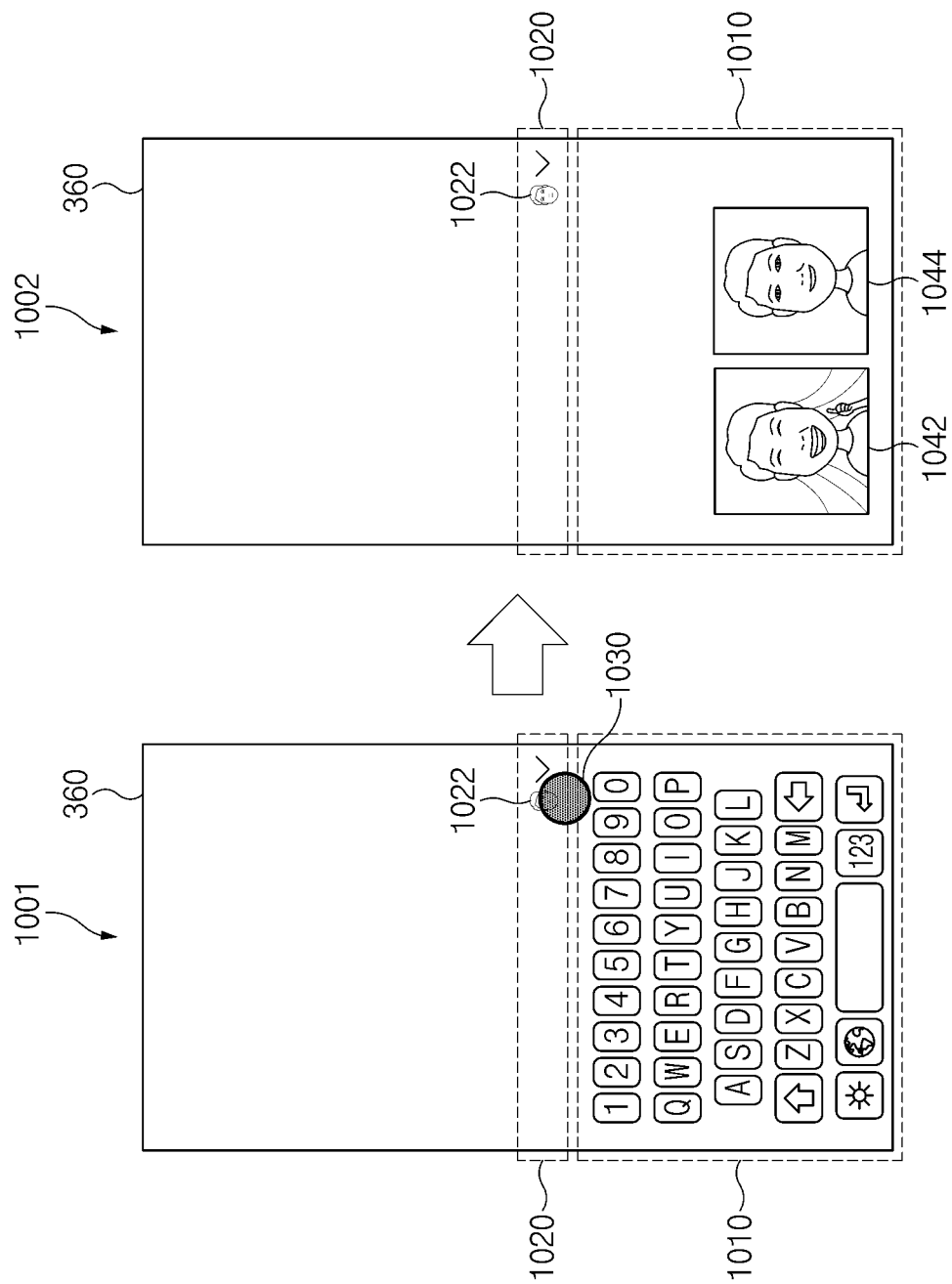
FIG. 10 is a diagram illustrating an example operation of an electronic device that displays an avatar sticker on a display according to various embodiments.

FIG. 10 is a diagram illustrating an example operation of the electronic device 101 that displays the avatar sticker on the display 360 according to various embodiments.

Referring to FIG. 10, in operation 1001, the electronic device 101 may display a keyboard layout 1010 on a portion of the display 360 when a message application is executed. The electronic device 101 may display a tool bar 1020 that provides a function associated with the keyboard layout 1010 at top (or bottom) of the keyboard layout 1010. The function associated with the keyboard layout 1010 may include, for example, and without limitation, at least one of emoticon, emoji, speech recognition, setting, automatic phrase recommendation, etc.

According to an example embodiment, the electronic device 101 may display an icon 1022 for calling a list of the avatar templates on at least a portion of the toolbar 1020. When an input, e.g., a user input, 1030 of selecting the icon 1022 is received, the electronic device 101 may display a list of the plurality of avatar templates stored in the template DB (e.g., 314 in FIG. 3) on at least a portion (e.g., a region where the keyboard layout 1010 is displayed) of the display 360.

As the number of the avatar templates displayed on the display 360 increases, a time required for finding an avatar template containing a gesture desired by the user may increase. Thus, when the user input 1030 is received, in operation 1002, the electronic device 101 may recommend to the user an avatar sticker generated based on the emotion state of the user.

For example, when the user input 1030 is received, the electronic device 101 may execute the camera 380 and generate an avatar sticker 1042 based on the operations illustrated in FIG. 6. The electronic device 101 may display the generated avatar sticker 1042 at a upper-left portion of other avatar templates (e.g., 1044) to recommend the avatar sticker 1042 to the user. FIG. 10 illustrates only an example embodiment of generating the avatar sticker in response to the user input of selecting the icon 1022 for calling the list of the avatar templates. However, in another example embodiment, the electronic device 101 may display a separate icon for generating the avatar sticker on at least a portion of the toolbar 1020.

In another example, the electronic device 101 may recommend the avatar sticker to the user based on history information indicating a usage history of the avatar stickers (e.g., 1042). An embodiment of recommending the avatar sticker based on the history information will be described in FIG. 12.

Figure 11:
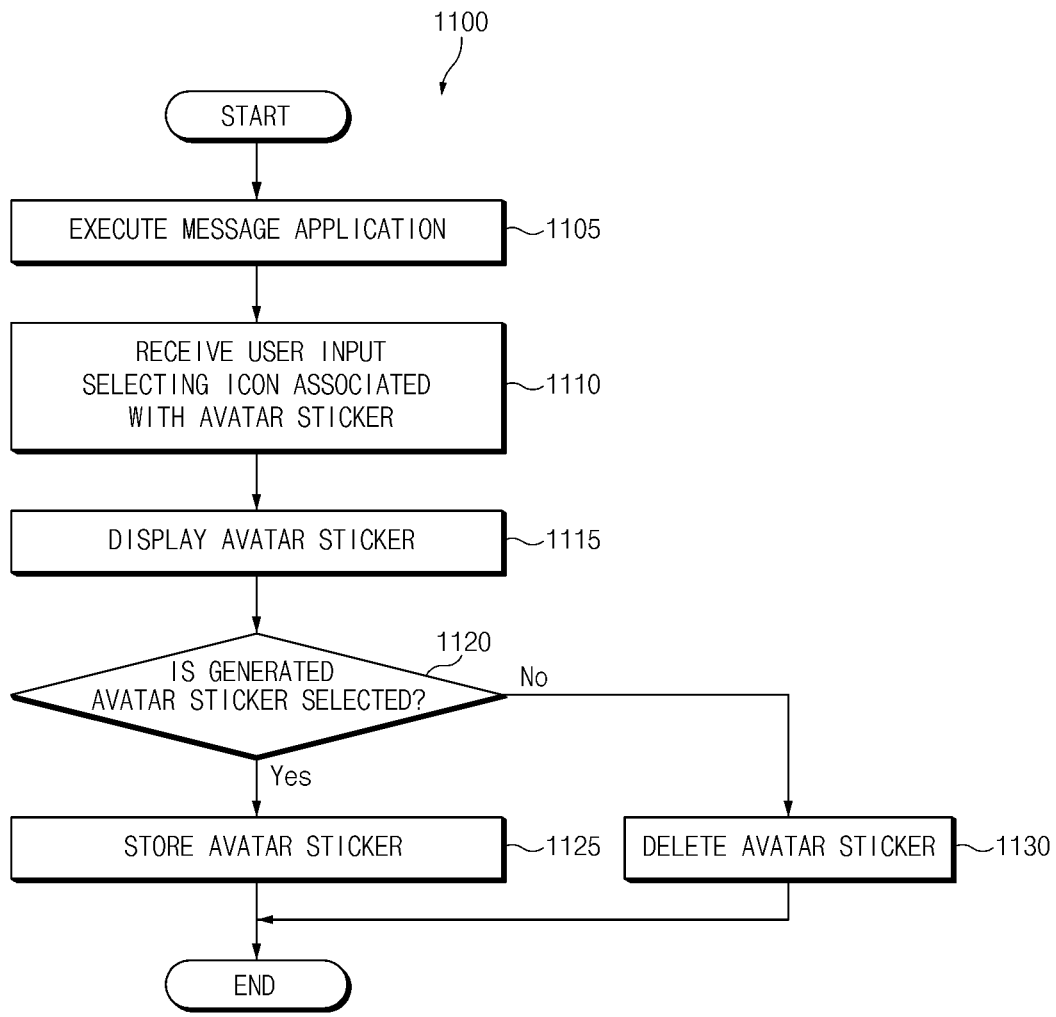
FIG. 11 is a flowchart illustrating an example operation of an electronic device that stores an avatar sticker based on user input according to various embodiments.

FIG. 11 is a flowchart 1100 illustrating an example operation of the electronic device 101 that stores an avatar sticker based on user input according to various embodiments.

Referring to FIG. 11, in operation 1105, the electronic device 101 may execute the message application.

In operation 1110, the electronic device 101 may receive the user input (e.g., 1030 in FIG. 10) selecting the icon associated with the avatar sticker (e.g., 1022 in FIG. 10).

In operation 1115, the electronic device 101 may display the avatar sticker (e.g., 1042 in FIG. 10). For example, the electronic device 101 may execute the camera (e.g., 380 in FIG. 3) in response to the operation 1110 and may generate the avatar sticker based on the operations illustrated in FIG. 6.

In operation 1120, the electronic device 101 may determine whether the user input selecting the generated avatar sticker is received. When user input selecting the avatar sticker is received ("Yes" in operation 1120), in operation 1125, the electronic device 101 may store the generated avatar sticker in the memory 130 (e.g., the avatar sticker DB 318 in FIG. 3). When the user input selecting the avatar sticker is not received, or when user input of selecting the avatar template (e.g., 1044 in FIG. 10) is received ("No" in operation 1120), in operation 1130, the electronic device 101 may delete the generated avatar sticker for a storage space efficiency of the memory 130.

FIG. 12 is a diagram illustrating an example operation of the electronic device 101 that generates an avatar sticker based on history information 1202 according to various embodiments.

Referring to FIG. 12, the electronic device 101 may, for example, and without limitation, use a machine learning system to generate information 1201 representing a current emotion state of the user and recommended avatar sticker information 1203 from the history information 1202 stored in the memory 130. Avatar stickers represented by the recommended avatar sticker information 1203 may, for example, include avatar templates stored in the template DB 314 or avatar stickers generated by the operations illustrated in FIG. 6. The electronic device 101 may use the machine learning system to determine scores for the avatar stickers, respectively, and determine a priority of the avatar stickers based on the determined scores. The electronic device 101 may recommend an avatar sticker with high priority to the user.

For example, when the electronic device 101 generates the recommended avatar sticker information 1203 via, for example, a deep Q network (DQN), the electronic device 101 may determine a reward value R for avatar stickers based on Equation 2 below.

$$R = -\sqrt{(1-S_u)^2}$$ (Equation 2)

In Equation 2, $S_u$ may refer, for example, to a score of an avatar sticker selected by the user. According to Equation 2, the reward may increase as the score of the selected avatar sticker increases. The electronic device 101 may continuously learn through the reward to update the history information 1202.

As described above, an electronic device (e.g., 101 in FIG. 1) may include: a camera (e.g., at least a portion of the camera module 180 in FIG. 1), a display (e.g., at least a portion of the display device 160 in FIG. 1), a processor (e.g., 120 in FIG. 1) operatively coupled to the camera and the display, and a memory (e.g., 130 in FIG. 1) operatively coupled to the processor. The memory may store a plurality of avatar templates containing a plurality of gestures and instructions. When the instructions are executed, the processor may control the electronic device to: obtain an image of an external object using the camera, obtain a value of at least one parameter corresponding to an emotion state based on the obtained image, select an avatar template containing a first gesture among the plurality of avatar templates based on the value of the at least one parameter, generate an avatar sticker containing a second gesture different from the first gesture based on the selected avatar template and the value of the at least one parameter, and display the generated avatar sticker on at least a portion of the display.

According to an embodiment, the second gesture may be different from the first gesture in at least one of a speed of movement, a range of change, or a type.

According to an embodiment, the instructions, when executed by the processor, may control the electronic device to: obtain a first motion vector for the selected avatar template, generate a second motion vector based on the first motion vector and the value of the at least one parameter, generate a plurality of successive first image frames representing the second gesture based on the second motion vector, and generate the avatar sticker based on the plurality of first image frames.

According to an embodiment, the memory may further include a plurality of background objects or a plurality of effect objects. Further, the instructions may, when executed by the processor, control the electronic device to: select a first background object among the plurality of background objects or a first effect object among the plurality of effect objects based on the value of the at least one parameter after the plurality of first image frames are generated, obtain a third motion vector for the first background object or the first effect object, generate a fourth motion vector based on the third motion vector and the value of the at least one parameter, generate a plurality of successive second image frames representing a second background object different from the first background object or representing a second effect object different from the first effect object based on the fourth motion vector, and generate the avatar sticker based on the plurality of first image frames and the plurality of second image frames.

According to an embodiment, the second background object and the second effect object may be different from the first background object and the first effect object, respectively, in at least one of a speed of movement, a range of change, a size, a color, and a type.

According to an embodiment, the electronic device may further include a wireless communication circuit configured to perform wireless communication with an external electronic device. Further, the instructions may, when executed by the processor, control the electronic device to: receive biometric information from the external electronic device via the wireless communication circuit, and obtain the value of the at least one parameter based on the biometric information and the obtained image.

According to an embodiment, the instructions may, when executed by the processor, control the electronic device to: execute a message application, display an icon for calling the plurality of avatar templates on at least a portion of the display, and execute the camera in response to a first input received on the icon.

According to an embodiment, the instructions may, when executed by the processor, control the electronic device to: display a list of the plurality of avatar templates and the generated avatar sticker on the at least a portion of the display, delete the avatar sticker from the memory when a second input of selecting an avatar template included in the list is received, and store the avatar sticker in the memory when a second input of selecting the avatar sticker is received.

According to an embodiment, the instructions may, when executed by the processor, control the electronic device to: store history information about the value of the at least one parameter based on a second input, determine a priority for the plurality of avatar templates or the avatar sticker based on the history information, and display the list of the plurality of avatar templates and the generated avatar sticker on the at least a portion of the display based on the priority in response to a third input received on the icon.

As described above, a method of operating an electronic device may include: obtaining an image of an external object, obtaining a value of at least one parameter corresponding to an emotion state based on the obtained image, selecting an avatar template containing a first gesture among a plurality of avatar templates based on the value of the at least one parameter, generating an avatar sticker containing a second gesture different from the first gesture based on the selected avatar template and the value of the at least one parameter, and displaying the generated avatar sticker.

According to an embodiment, the generating of the avatar sticker may include obtaining a first motion vector for the selected avatar template, generating a second motion vector based on the first motion vector and the value of the at least one parameter, generating a plurality of successive first image frames representing the second gesture based on the second motion vector, and generating the avatar sticker based on the plurality of first image frames.

According to an embodiment, the generating of the avatar sticker may include selecting a first background object among a plurality of background objects or a first effect object among a plurality of effect objects based on the value of the at least one parameter after the plurality of first image frames are generated, obtaining a third motion vector for the first background object or the first effect object, generating a fourth motion vector based on the third motion vector and the value of the at least one parameter, generating a plurality of successive second image frames representing a second background object different from the first background object or representing a second effect object different from the first effect object based on the fourth motion vector, and generating the avatar sticker based on the plurality of first image frames and the plurality of second image frames.

According to an embodiment, the second gesture may be different from the first gesture in at least one of a speed of movement, a range of change, or a type, and the second background object and the second effect object may be respectively different from the first background object and the first effect object in at least one of a speed of movement, a range of change, a size, a color, and a type.

According to an embodiment, the method may further include receiving biometric information from an external electronic device. The obtaining of the value of the at least one parameter may include obtaining the value of the at least one parameter based on the biometric information and the obtained image.

According to an embodiment, the obtaining of the image of the external object may include executing a message application, displaying an icon for calling the plurality of avatar templates, and obtaining the image of the external object in response to a first input received on the icon. The method may further include storing the avatar sticker in a memory of the electronic device based on an input of selecting the avatar sticker being received, or deleting the avatar sticker from the memory of the electronic device when the input of selecting the avatar sticker is not received.

As described above, an electronic device (e.g., 101 in FIG. 1) may include: a camera (e.g., at least a portion of the camera module 180 in FIG. 1), a display (e.g., at least a portion of the display device 160 in FIG. 1), a processor (e.g., 120 in FIG. 1) operatively coupled to the camera and the display, and a memory (e.g., 130 in FIG. 1) operatively coupled to the processor. The memory may store a plurality of avatar templates including an avatar template containing a first gesture and instructions. When the instructions are executed, the processor may control the electronic device to: execute a message application, display an icon for calling the plurality of avatar templates on at least a portion of the display, execute the camera in response to an input received on the icon, obtain an image of an external object using the camera, obtain a value of at least one parameter corresponding to an emotion state based on the obtained image, generate an avatar sticker containing a second gesture different from the first gesture based on the value of the at least one parameter, and display the generated avatar sticker on at least a portion of the display.

According to an embodiment, the instructions may, when executed by the processor, control the electronic device to: select an avatar template containing the first gesture among the plurality of avatar templates based on the value of the at least one parameter, obtain a first motion vector for the selected avatar template, generate a second motion vector based on the first motion vector and the value of the at least one parameter, generate a plurality of successive first image frames representing the second gesture based on the second motion vector, and generate the avatar sticker based on the plurality of first image frames.

According to an embodiment, the memory may further include a plurality of background objects or a plurality of effect objects. Further, the instructions may, when executed by the processor, control the electronic device to: select a first background object among the plurality of background objects or a first effect object among the plurality of effect objects based on the value of the at least one parameter after the plurality of first image frames are generated, generate a third motion vector and generate a fourth motion vector based on the value of the at least one parameter, generate a plurality of successive second image frames representing a second background object different from the first background object or representing a second effect object different from the first effect object based on the fourth motion vector, and generate the avatar sticker based on the plurality of first image frames and the plurality of second image frames.

According to an embodiment, the second gesture may be different from the first gesture in at least one of a speed of movement, a range of change, or a type, and the second background object and the second effect object may be respectively different from the first background object and the first effect object in at least one of a speed of movement, a range of change, a size, a color, and a type.

According to an embodiment, the instructions may, when executed by the processor, control the electronic device to: store the avatar sticker in the memory based on an input of selecting the avatar sticker being received, or delete the avatar sticker from the memory when the input of selecting the avatar sticker is not received.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed herein, the electronic device may analyze the image of the user and provide the user with the avatar sticker that accurately represents the emotion state of the user based on the analyzed image.

According to embodiments disclosed herein, the electronic device may reduce the time required for the user to identify the list to select the desired avatar sticker by recommending the avatar sticker to the user based on the analyzed emotion state of the user or the usage history of the avatar sticker.

In addition, various effects, directly or indirectly understood through this disclosure, may be provided.

While the disclosure has been illustrated and described with reference to various example embodiments thereof, it will be understood by those skilled in the art that the example embodiments are intended to be illustrative, not limiting, and that various changes in form and details may be made therein without departing from the spirit and scope of the disclosure as defined, for example, by the appended claims and their equivalents.

What is claimed is:

1. An electronic device comprising:
 a camera;
 a display;
 a processor operatively coupled to the camera and the display; and
 a memory operatively coupled to the processor, wherein the memory is configured to store a plurality of avatar templates containing a plurality of gestures and instructions,
 wherein, the instructions, when executed by the processor, control the electronic device to:
  obtain an image of an external object using the camera;
  obtain values of a plurality of parameters corresponding to an emotion state based on the obtained image;
  select an avatar template including a first gesture from among the plurality of avatar templates based on the values of the plurality of parameters;
  obtain a plurality of first motion vectors pre-defined for the selected avatar template;
  generate a second motion vector representing the emotion state of the external object by adding the plurality of first motion vectors, wherein the plurality of first motion vectors are multiplied by a respective weight corresponding to a value of one parameter of the plurality of parameters;
  generate a plurality of successive first image frames representing a second gesture different from the first gesture based on the second motion vector;
  generate an avatar sticker including the second gesture based on the selected avatar template, the value of at least one parameter of the plurality of parameters and the plurality of first image frames; and
  display the generated avatar sticker on at least a portion of the display.

2. The electronic device of claim 1, wherein the second gesture is different from the first gesture in at least one of a speed of movement, a range of change, or a type.

3. The electronic device of claim 1, wherein the external object is a user of the electronic device and the instructions, when executed by the processor, control the electronic device to:
 receive biometric information corresponding to the user during a time period associated with the camera being controlled to acquire the image of the user; and
 receive a text input by the user using the electronic device,
 wherein the value of at least one parameter of the plurality of parameters corresponding to the emotion state is obtained based on the image, the text and the biometric information.

4. The electronic device of claim 1, wherein the memory further includes a plurality of background objects and/or a plurality of effect objects, and
 wherein the instructions, when executed by the processor, control the electronic device to:
  select a first background object from among the plurality of background objects or a first effect object from among the plurality of effect objects based on the value of at least one parameter of the plurality of parameters after the plurality of first image frames are generated;
  obtain a third motion vector for the first background object or the first effect object;

generate a fourth motion vector based on the third motion vector and the value of the at least one parameter of the plurality of parameters;
generate a plurality of successive second image frames representing a second background object different from the first background object or representing a second effect object different from the first effect object based on the fourth motion vector; and
generate the avatar sticker based on the plurality of first image frames and the plurality of second image frames.

5. The electronic device of claim 4, wherein the second background object is different from the first background object, and the second effect object is different from the first effect object in at least one of a speed of movement, a range of change, a size, a color, and a type.

6. The electronic device of claim 1, further comprising a wireless communication circuit configured to perform wireless communication with an external electronic device, and
wherein the instructions, when executed by the processor, control the electronic device to:
receive biometric information from the external electronic device via the wireless communication circuit; and
obtain the value of at least one parameter of the plurality of parameters based on the biometric information and the obtained image.

7. The electronic device of claim 1, wherein the instructions, when executed by the processor, control the electronic device to:
execute a message application;
display an icon for calling the plurality of avatar templates on at least a portion of the display; and
execute the camera in response to receiving a first input on the icon.

8. The electronic device of claim 7, wherein the instructions, when executed by the processor, control the electronic device to:
display a list of the plurality of avatar templates and the generated avatar sticker on the at least a portion of the display;
delete the avatar sticker from the memory based on a second input of selecting an avatar template included in the list being received; and
store the avatar sticker in the memory based on a second input of selecting the avatar sticker being received.

9. The electronic device of claim 8, wherein the instructions, when executed by the processor, control the electronic device to:
store history information about the value of the at least one parameter based on the second input;
determine a priority for the plurality of avatar templates or the avatar sticker based on the history information; and
display the list of the plurality of avatar templates and the generated avatar sticker on the at least a portion of the display based on the priority in response to receiving a third input on the icon.

10. A method of operating an electronic device, the method comprising:
obtaining an image of an external object;
obtaining values of a plurality of parameters corresponding to an emotion state based on the obtained image;
selecting an avatar template including a first gesture from among a plurality of avatar templates based on the values of the plurality of parameters;
obtaining a plurality of first motion vector pre-defined for the selected avatar template;
generating a second motion vector representing the emotion state of the external object by adding the plurality of first motion vectors, wherein the plurality of first motion vectors are multiplied by a respective weight corresponding to a value of one parameter of the plurality of parameters;
generating a plurality of successive first image frames representing a second gesture different from the first gesture based on the second motion vector;
generating an avatar sticker including the second gesture based on the selected avatar template, the value of at least one parameter of the plurality of parameters and the plurality of first image frames; and
displaying the generated avatar sticker.

11. The method of claim 10, wherein the external object is a user of the electronic device and the generating of the avatar sticker includes:
receiving biometric information corresponding to the user during a time period associated with obtaining the image of the user; and
receiving a text input by the user using the electronic device,
wherein the value of at least one parameter of the plurality of parameters corresponding to the emotion state is obtained based on the image, the text and the biometric information.

12. The method of claim 10, wherein the generating of the avatar sticker includes:
selecting a first background object from among a plurality of background objects or a first effect object from among a plurality of effect objects based on the value of at least one parameter values of the plurality of parameters after the plurality of first image frames are generated;
obtaining a third motion vector for the first background object or the first effect object;
generating a fourth motion vector based on the third motion vector and the value of the at least one parameter of the plurality of parameters;
generating a plurality of successive second image frames representing a second background object different from the first background object or representing a second effect object different from the first effect object based on the fourth motion vector; and
generating the avatar sticker based on the plurality of first image frames and the plurality of second image frames.

13. The method of claim 12, wherein the second gesture is different from the first gesture in at least one of a speed of movement, a range of change, or a type, and
wherein the second background object is different from the first background object and the second effect object is different from the first effect object in at least one of a speed of movement, a range of change, a size, a color, and a type.

14. The method of claim 10, further comprising:
receiving biometric information from an external electronic device,
wherein the obtaining of the value of at least one parameter of the plurality of parameters includes:
obtaining the value of the at least one parameter based on the biometric information and the obtained image.

15. The method of claim 10, wherein the obtaining of the image of the external object includes:
executing a message application;
displaying an icon for calling the plurality of avatar templates; and obtaining the image of the external object in response to receiving a first input on the icon, wherein the method further includes:
storing the avatar sticker in a memory of the electronic device based on an input of selecting the avatar sticker being received; or
deleting the avatar sticker from the memory of the electronic device based on the input of selecting the avatar sticker not being received.

16. An electronic device comprising:
a camera;
a display;
a processor operatively coupled to the camera and the display; and
a memory operatively coupled to the processor, wherein the memory is configured to store a plurality of avatar templates including an avatar template containing a first gesture and instructions,
wherein the instructions, when executed by the processor, control the electronic device to:
execute a message application;
display an icon for calling the plurality of avatar templates on at least a portion of the display;
execute the camera in response to receiving an input on the icon;
obtain an image of an external object using the camera;
obtain values of a plurality of parameters corresponding to an emotion state based on the obtained image;
select an avatar template containing the first gesture from among the plurality of avatar templates based on the values of the plurality of parameters;
obtain a plurality of first motion vectors pre-defined for the selected avatar template;
generate a second motion vector representing the emotion state of the external object by adding the plurality of first motion vectors, wherein the plurality of first motion vectors are multiplied by a respective weight corresponding to a value of one parameter of the plurality of parameters;
generate a plurality of successive first image frames representing a second gesture different from the first gesture based on the second motion vector;
generate an avatar sticker including the second gesture based on the value of at least one parameter of the plurality of parameters and the plurality of successive first image frames; and
display the generated avatar sticker on the at least a portion of the display.

17. The electronic device of claim 16, wherein the memory further includes a plurality of background objects or a plurality of effect objects, and
wherein the instructions, when executed by the processor, control the electronic device to:
select a first background object from among the plurality of background objects or a first effect object from among the plurality of effect objects based on the value of at least one parameter of the plurality of parameters after the plurality of first image frames are generated;
obtain a third motion vector for the first background object or the first effect object;
generate a fourth motion vector based on the third motion vector and the value of at least one parameter of the plurality of parameters;
generate a plurality of successive second image frames representing a second background object different from the first background object or representing a second effect object different from the first effect object based on the fourth motion vector; and
generate the avatar sticker based on the plurality of first image frames and the plurality of second image frames.

18. The electronic device of claim 17, wherein the second gesture is different from the first gesture in at least one of a speed of movement, a range of change, or a type, and
wherein the second background object is different from the first background object and the second effect object is different from the first effect object in at least one of a speed of movement, a range of change, a size, a color, and a type.

19. The electronic device of claim 16, wherein the instructions, when executed by the processor, control the electronic device to:
store the avatar sticker in the memory based on an input of selecting the avatar sticker being received; or
delete the avatar sticker from the memory based on the input of selecting the avatar sticker not being received.

* * * * *